United States Patent
Rosenstein et al.

(10) Patent No.: US 11,082,381 B2
(45) Date of Patent: **\*Aug. 3, 2021**

(54) SYSTEMS AND METHODS FOR GENERATING TASKS BASED ON CHAT SESSIONS BETWEEN USERS OF A COLLABORATION ENVIRONMENT

(71) Applicant: Asana, Inc., San Francisco, CA (US)

(72) Inventors: Justin Rosenstein, San Francisco, CA (US); Adam Butler, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/839,514

(22) Filed: Apr. 3, 2020

(65) Prior Publication Data

US 2020/0244611 A1 Jul. 30, 2020

Related U.S. Application Data

(63) Continuation of application No. 15/908,647, filed on Feb. 28, 2018, now Pat. No. 10,623,359.

(51) Int. Cl.
*G06F 15/16* (2006.01)
*G06F 3/0484* (2013.01)
*H04L 12/58* (2006.01)
*G06F 40/30* (2020.01)
*G06F 40/289* (2020.01)

(52) U.S. Cl.
CPC ............ *H04L 51/18* (2013.01); *G06F 40/289* (2020.01); *G06F 40/30* (2020.01)

(58) Field of Classification Search
CPC ......... H04L 51/18; H04L 51/32; H04L 51/04; H04L 51/02; G06F 17/2785; G06F 17/2775; G06F 40/289; G06F 40/30
USPC ....................................................... 709/206
See application file for complete search history.

(56) References Cited

U.S. PATENT DOCUMENTS

| | | | |
|---|---|---|---|
| 5,608,898 | A | 3/1997 | Turpin |
| 5,611,076 | A | 3/1997 | Durflinger |
| 5,721,770 | A | 2/1998 | Kohler |
| 6,332,147 | B1 | 12/2001 | Moran |
| 6,769,013 | B2 | 7/2004 | Frees |
| 7,086,062 | B1 | 8/2006 | Faour |
| 7,676,542 | B2 | 3/2010 | Moser |
| 7,779,039 | B2 | 8/2010 | Weissman |

(Continued)

OTHER PUBLICATIONS

Creating Tables with Fields from 2 Different Tables, published: 2009, publisher: StackOverflow, pp. 1-2. (Year: 2009).

(Continued)

*Primary Examiner* — Ruolei Zong
(74) *Attorney, Agent, or Firm* — Esplin & Associates, PC

(57) ABSTRACT

Systems and methods for generating tasks based on chat sessions between users of a collaboration environment are disclosed. Exemplary implementations may: obtain content information characterizing content of the chat sessions between the users of the collaboration environment; generate tasks for the users based on the content from the chat sessions, a first task being generated based on the first content information for the first chat session; and/or store information defining the tasks generated as part of the state information such that the first task is defined by a first task record.

20 Claims, 3 Drawing Sheets

(56) References Cited

U.S. PATENT DOCUMENTS

| | | | |
|---|---|---|---|
| RE41,848 E | 10/2010 | Daniell | |
| 7,996,774 B1 | 8/2011 | Sidenur | |
| 8,522,240 B1 | 8/2013 | Merwarth | |
| 8,527,287 B1 | 9/2013 | Bhatia | |
| 9,208,262 B2 | 12/2015 | Bechtel | |
| 9,600,136 B1 | 3/2017 | Yang | |
| 9,674,361 B2* | 6/2017 | Ristock | H04L 67/327 |
| 9,830,398 B2 | 11/2017 | Schneider | |
| 9,949,681 B2 | 4/2018 | Badenes | |
| 10,264,067 B2 | 4/2019 | Subramani | |
| 10,308,992 B2 | 6/2019 | Chauvin | |
| 10,616,151 B1 | 4/2020 | Cameron | |
| 10,623,359 B1 | 4/2020 | Rosenstein | |
| 10,671,692 B2 | 6/2020 | Koopman | |
| 10,810,222 B2 | 10/2020 | Koch | |
| 10,846,297 B2 | 11/2020 | Smith | |
| 2002/0143594 A1 | 10/2002 | Kroeger | |
| 2003/0028595 A1 | 2/2003 | Vogt | |
| 2003/0097406 A1 | 5/2003 | Stafford | |
| 2003/0097410 A1 | 5/2003 | Atkins | |
| 2003/0126001 A1 | 7/2003 | Northcutt | |
| 2003/0200223 A1 | 10/2003 | Hack | |
| 2003/0225598 A1 | 12/2003 | Yu | |
| 2004/0093290 A1 | 5/2004 | Doss | |
| 2004/0098291 A1 | 5/2004 | Newburn | |
| 2004/0162833 A1 | 8/2004 | Jones | |
| 2004/0207249 A1 | 10/2004 | Baumgartner | |
| 2004/0230447 A1 | 11/2004 | Schwerin-Wenzel | |
| 2005/0210394 A1 | 9/2005 | Crandall | |
| 2005/0222971 A1 | 10/2005 | Cary | |
| 2006/0143270 A1* | 6/2006 | Wodtke | G06Q 10/107 709/206 |
| 2006/0190391 A1 | 8/2006 | Cullen, III | |
| 2006/0277487 A1 | 12/2006 | Poulsen | |
| 2007/0038494 A1 | 2/2007 | Kreitzberg | |
| 2008/0082389 A1 | 4/2008 | Gura | |
| 2008/0082956 A1 | 4/2008 | Gura | |
| 2008/0091782 A1* | 4/2008 | Jakobson | G06Q 10/10 709/206 |
| 2008/0158023 A1 | 7/2008 | Chung | |
| 2008/0167937 A1 | 7/2008 | Coughlin | |
| 2008/0244582 A1 | 10/2008 | Brown | |
| 2008/0270198 A1 | 10/2008 | Graves | |
| 2008/0281665 A1 | 11/2008 | Opaluch | |
| 2009/0299803 A1 | 12/2009 | Lakritz | |
| 2009/0307319 A1 | 12/2009 | Dholakia | |
| 2010/0088137 A1 | 4/2010 | Weiss | |
| 2010/0106627 A1 | 4/2010 | O'Sullivan | |
| 2010/0131860 A1 | 5/2010 | Dehaan | |
| 2010/0145801 A1 | 6/2010 | Chekuri | |
| 2010/0169802 A1 | 7/2010 | Goldstein | |
| 2010/0312605 A1 | 12/2010 | Mitchell | |
| 2011/0015961 A1 | 1/2011 | Chan | |
| 2011/0060720 A1 | 3/2011 | Devereux | |
| 2011/0161128 A1 | 6/2011 | Barney | |
| 2012/0035942 A1 | 2/2012 | Graupner | |
| 2012/0066030 A1 | 3/2012 | Limpert | |
| 2012/0158946 A1 | 6/2012 | Shafiee | |
| 2012/0192086 A1 | 7/2012 | Ghods | |
| 2013/0013560 A1 | 1/2013 | Goldberg | |
| 2013/0014023 A1 | 1/2013 | Lee | |
| 2013/0073328 A1 | 3/2013 | Ehrler | |
| 2013/0124638 A1 | 5/2013 | Barreto | |
| 2013/0179799 A1 | 7/2013 | Savage | |
| 2013/0246399 A1 | 9/2013 | Schneider | |
| 2013/0279685 A1 | 10/2013 | Kohler | |
| 2014/0040780 A1 | 2/2014 | Artzt | |
| 2014/0059910 A1 | 3/2014 | Norton | |
| 2014/0089719 A1 | 3/2014 | Daum | |
| 2014/0189017 A1* | 7/2014 | Prakash | G06Q 10/109 709/206 |
| 2014/0208325 A1 | 7/2014 | Chen | |
| 2014/0257894 A1 | 9/2014 | Melahn | |
| 2014/0288987 A1 | 9/2014 | Liu | |
| 2015/0007058 A1 | 1/2015 | Wooten | |
| 2015/0363092 A1* | 12/2015 | Morton | H04M 1/72552 715/752 |
| 2015/0379472 A1 | 12/2015 | Gilmour | |
| 2016/0063449 A1 | 3/2016 | Duggan | |
| 2016/0124775 A1 | 5/2016 | Ashtiani | |
| 2016/0180277 A1 | 6/2016 | Skiba | |
| 2016/0216854 A1* | 7/2016 | McClellan | G06Q 10/10 |
| 2016/0224939 A1* | 8/2016 | Chen | G06Q 10/06311 |
| 2016/0328217 A1 | 11/2016 | Hagerty | |
| 2017/0017924 A1 | 1/2017 | Kashiwagi | |
| 2017/0061341 A1 | 3/2017 | Haas | |
| 2017/0068933 A1 | 3/2017 | Norton | |
| 2017/0093874 A1 | 3/2017 | Uthe | |
| 2017/0103369 A1 | 4/2017 | Thompson | |
| 2017/0116552 A1 | 4/2017 | Deodhar | |
| 2017/0132200 A1 | 5/2017 | Noland | |
| 2017/0154024 A1* | 6/2017 | Subramanya | H04L 51/08 |
| 2017/0206217 A1 | 7/2017 | Deshpande | |
| 2017/0249577 A1 | 8/2017 | Nishikawa | |
| 2017/0316367 A1 | 11/2017 | Candito | |
| 2017/0317898 A1 | 11/2017 | Candito | |
| 2017/0323233 A1 | 11/2017 | Bencke | |
| 2017/0344754 A1* | 11/2017 | Kumar | G06F 21/6245 |
| 2017/0351385 A1 | 12/2017 | Ertmann | |
| 2018/0059910 A1 | 3/2018 | Wooten | |
| 2018/0060818 A1 | 3/2018 | Ishiyama | |
| 2018/0102989 A1 | 4/2018 | Borsutsky | |
| 2018/0131649 A1 | 5/2018 | Ma | |
| 2018/0225795 A1 | 8/2018 | Napoli | |
| 2018/0247263 A1* | 8/2018 | Rogers | H04L 51/02 |
| 2018/0260081 A1 | 9/2018 | Beaudoin | |
| 2018/0367477 A1 | 12/2018 | Hariram | |
| 2019/0014070 A1* | 1/2019 | Mertvetsov | G06N 3/08 |
| 2019/0340574 A1 | 11/2019 | Ekambaram | |
| 2020/0065736 A1 | 2/2020 | Relangi | |
| 2020/0328906 A1 | 10/2020 | Raghavan | |
| 2020/0344253 A1 | 10/2020 | Kurup | |

OTHER PUBLICATIONS

"Rules of Data Conversion from Document to Relational Databases", published: 2014, publisher: Future-processing, pp. 1-8 (Year: 2014).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

www.asana.com (as retrieved from https://web.archive.Org/web/20160101054536/https://asana.com/press and https:// web.archive.org/web/20160101054527/https://asana.com/product) (Year: 2016) 15 pages.

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

Hartmann, "TimeProjectscheduling with resource capacities and requests varying with time: a case study," 2013, Flexible services and manufacturing journal, vol. 25, No. 1, pp. 74-93 (Year: 2013).

Paul Minors, How to automate your tasks, youtube excerpts, Oct. 18, 2019 https://www.youtube.com/watch?v=lwF9XyUQrzw (Year: 2019).

(56) References Cited

OTHER PUBLICATIONS

Mauricio Aizawa, Zapier, How to Automate Asana Tasks creation using Evernote, youtube excerpts, Mar. 16, 2018 https://www.youtube.com/watch?v=BjDQ4Gny4Wl (Year: 2018).

* cited by examiner

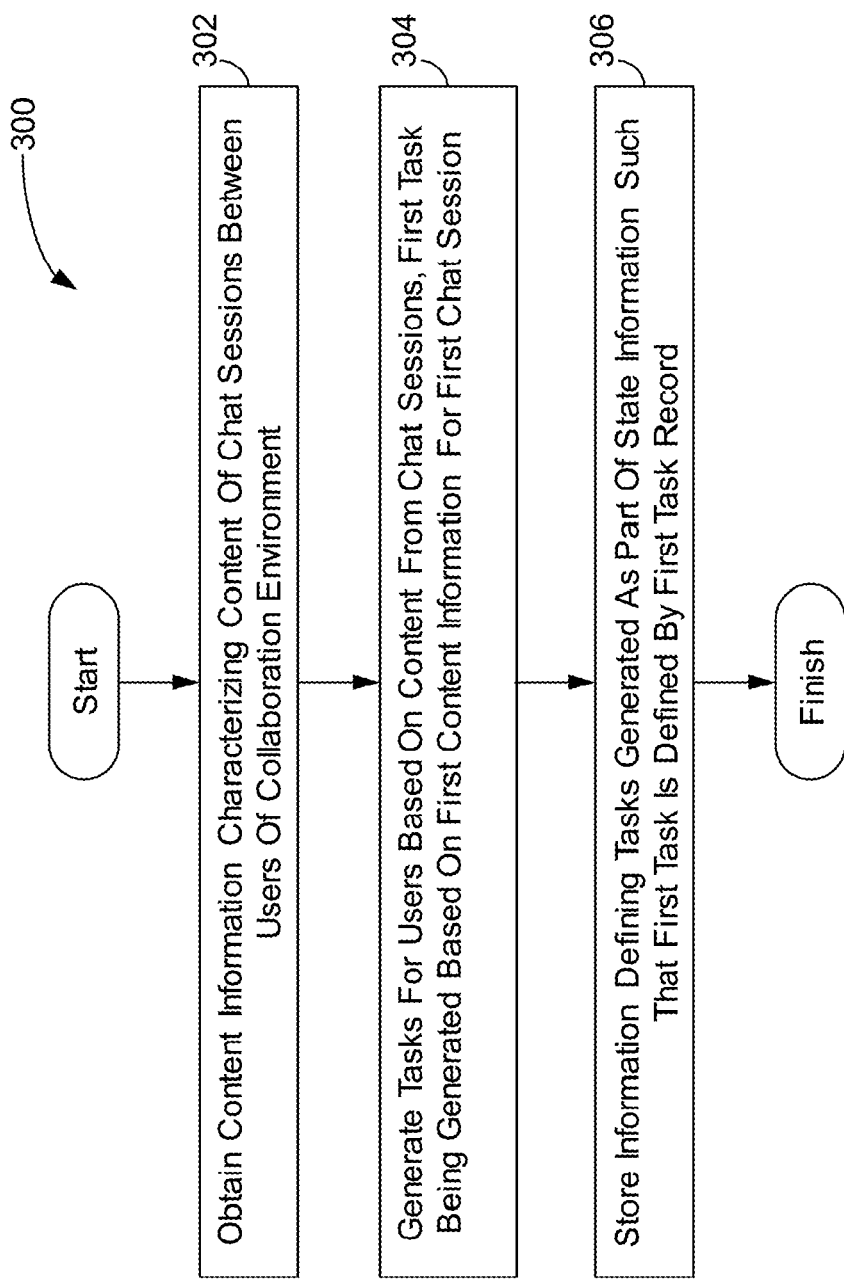

SYSTEMS AND METHODS FOR GENERATING TASKS BASED ON CHAT SESSIONS BETWEEN USERS OF A COLLABORATION ENVIRONMENT

FIELD OF THE DISCLOSURE

The present disclosure relates to systems and methods for generating tasks based on chat sessions between users of a collaboration environment.

BACKGROUND

Generic work management platforms typically require users to manually input to-do items and/or tasks. Without such manual input, computers generally cannot generate and manage tasks for users automatically. This creates more work for users and reduces user efficiency. As such, users and companies waste valuable resources and may be unlikely to use a work management platform long term.

SUMMARY

One aspect of the present disclosure relates to a system configured for generating tasks based on chat sessions between users of a collaboration environment. The tasks may be determined dynamically for one or more users participating in a chat session through the graphical chat interface and/or based on content from the chat session through the graphical chat interface. The processor(s) may be configured to obtain content information characterizing content of the chat sessions between the users of the collaboration environment. The chat sessions may facilitate synchronous communication between the users. In some implementations, the chat sessions may be hosted within the collaboration environment and/or may be external to the collaboration environment. The chat sessions may include a first chat session between a first user and a second user. First content information characterizing content of the first chat session may be obtained. The processor(s) may be configured to generate tasks for the users based on the content from the chat sessions. A first task may be generated based on the first content information for the first chat session. The processor(s) may be configured to store information defining the tasks generated as part of the state information. As such, the first task may be defined by a first task record.

Another aspect of the present disclosure relates to a method for generating tasks based on chat sessions between users of a collaboration environment. The method may include obtaining content information characterizing content of the chat sessions. The chat sessions may facilitate synchronous communication between the users of the collaboration environment. The chat sessions may include a first chat session between a first user and a second user. The first content information characterizing content of the first chat session may be obtained. The method may include generating tasks for the users based on the content from the chat sessions. A first task may be generated based on the first content information for the first chat session. The method may include storing information defining the tasks generated as part of the state information. As such, the first task may be defined by a first task record.

Yet another aspect of the present disclosure relates to a non-transient computer-readable storage medium having instructions embodied thereon, the instructions being executable by one or more processors to perform a method for generating tasks based on chat sessions between users of a collaboration environment. The method may include obtaining content information characterizing content of the chat sessions between the users of the collaboration environment. The chat sessions may facilitate synchronous communication between the users and wherein the chat sessions include a first chat session between a first user and a second user. As such, the first content information characterizing content of the first chat session may be obtained. The method may include generating tasks for the users based on the content from the chat sessions. A first task may be generated based on the first content information for the first chat session. The method may include storing information defining the tasks generated as part of the state information such that the first task is defined by a first task record.

The presentation of the collaboration environment may be based on environment state information. The storage component may be configured to effectuate storage of the environmental state information. The environmental state information may define the state of the collaboration environment. The state of the collaboration environment may comprise a user state, a project state, a task state, and/or or other states that make up the collaboration environment state. The environmental state information may include one or more records. The one or more records may include one or more user records, project records, task records, and/or other records. The user state may be defined by one or more of the user records. The user records may define values of user parameters associated with users interacting with, viewing, and/or able to interact with or view the collaboration environment. The project state may be defined by the project records. The project records may define values of project parameters for projects managed within the collaboration environment. The task state may be defined by the task record. The task record may define values of task parameters for tasks created and/or assigned within the collaboration environment.

In some implementations, a system for generating tasks based on chat sessions between users of a collaboration environment may include one or more of: one or more servers, one or more client computing platforms, and/or other components. The one or more servers may be configured to communicate with one or more client computing platforms according to a client/server architecture and/or other architecture. The one or more servers, chat servers, and/or client computing platforms may include one or more physical processors configured to execute one or more computer program components. The computer program components may include one or more of an environment state component, a chat application component, a collaboration environment component, a user chat component, a user task component, a trigger phrase component, and/or other components.

The environment state component may be configured to effectuate transmission of the environment state information to client computing platform(s), and/or vice versa. In some implementations, the environment state component may be configured to receive information over a network from the client computing platforms(s). The environment state component may be configured to effectuate storage of the received information as environment state information to one or more of the user records, the project records, the task records, and/or other records.

The collaboration environment component may be configured to effectuate presentation of a collaboration environment. Presentation of the collaboration environment may be based on environment state information. The environment state information may include user records, project records, task records, and/or other records.

In some implementations, the user chat component may be configured to implement an instance of a chat session to facilitate synchronous communication between the users within the collaboration environment. The user chat component may effectuate transmission and/or presentation of the textual communications that make up the chat session to the client computing platforms for presentation through graphical chat interfaces. In some implementations, the chat application component may be configured to implement an instance of a chat session to facilitate synchronous communication between the users within the collaboration environment. The chat application component may effectuate transmission of the textual communications that make up the chat session to the client computing platforms for presentation through graphical chat interfaces. In some implementations, the chat session may be hosted by the work management platform and/or a third-party application associated with the chat application component. The graphical chat interfaces may be presented on the client computing platforms within and/or outside the collaboration environment.

The user chat component may be configured to obtain content information characterizing content of chat sessions between the users of the collaboration environment. The user task component may be configured to generate tasks for the users based on the content from the chat sessions. The user task component may be configured to store information defining the tasks generated as part of the state information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates a method for generating tasks based on chat sessions between users of a collaboration environment, in accordance with one or more implementations.

DETAILED DESCRIPTION

Figure 1:
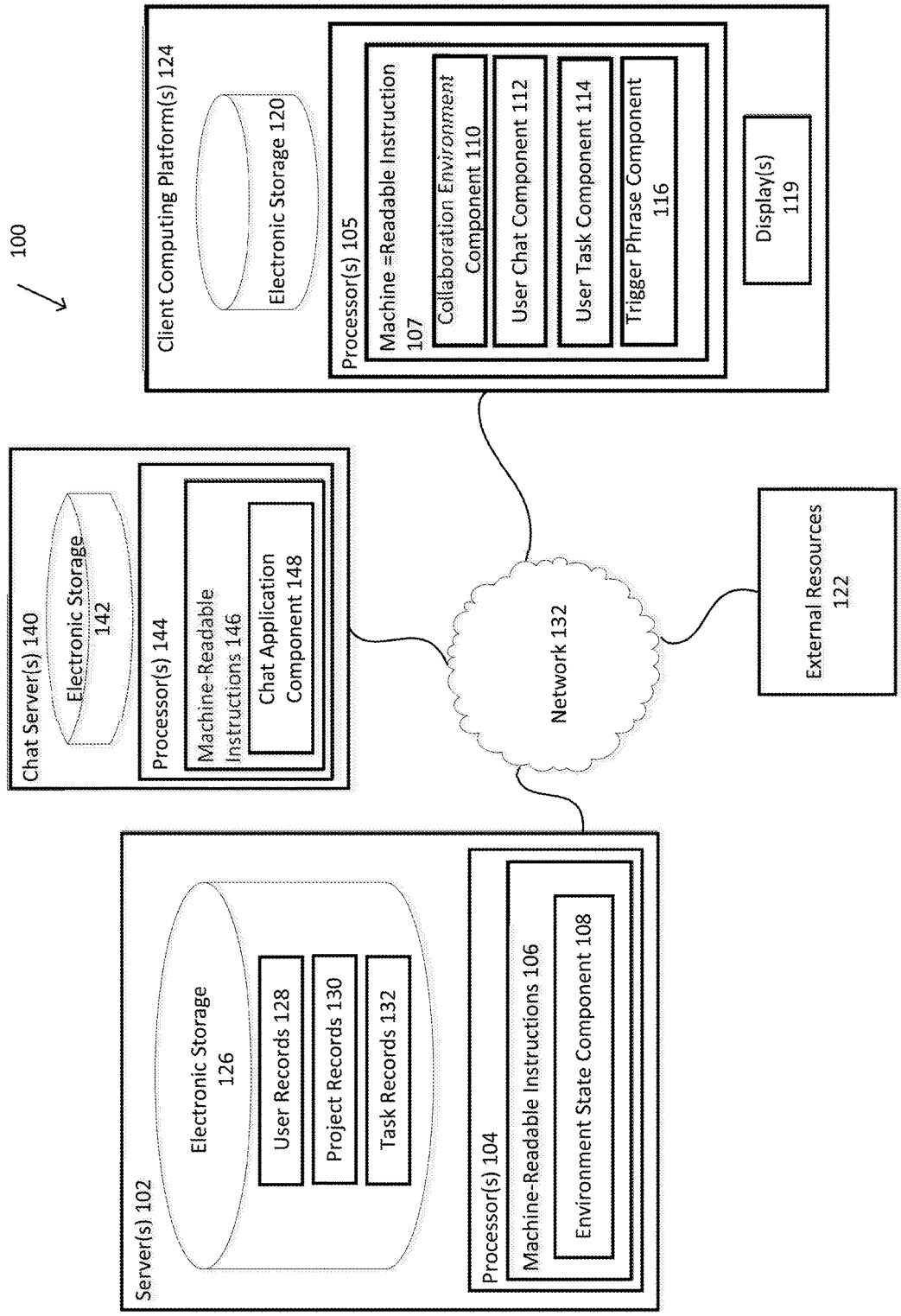
FIG. 1 illustrates a system configured for generating tasks based on chat sessions between users of a collaboration environment, in accordance with one or more implementations.

Generating tasks based on chat sessions between users of within a collaboration environment may enable generation of tasks based on synchronous and/or semi-synchronous communications between multiple users. The tasks may be determined dynamically for one or more users participating in a chat session through the graphical chat interface and/or based on content from the chat session through the graphical chat interface. Tasks may be automatically generated for the sender of a communication, one or more recipients of the communication, and/or other users based on the content of the one or more chat sessions. Tasks may be generated in real-time, near-real time, at the end of a given chat session, and/or at any other time during the given chat session.

The presentation of the collaboration environment may be based on environment state information. The environment state information may include user records 128, project records 130, task records 132, and/or other records. The environment state information may be continuously generated and/or updated based on the state of the collaboration environment representing the users' interactions with the collaboration environment. The state of the collaboration environment may include a user state, a project state, a task state, and/or other states. The user state may be defined by user records 128. User records 128 may define values of user parameters associated with users interacting with and/or viewing the collaboration environment. The project state may be defined by project records 130. Project records 130 may define values of project parameters for projects managed within the collaboration environment. The task state may be defined by task records 132. Task records 132 may define values of task parameters for tasks created and/or assigned within the collaboration environment.

The user parameters associated with the users interacting with and/or viewing the collaboration environment may include parameters describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The user parameters may, by way of non-limiting example, include one or more of: a user name, a user role, a user department, descriptive user content, a to-email, a from-email, a photo, an organization, a workspace, one or more projects (which may include project parameters defined by one or more project records); one or more tasks (which may include one or more task parameters defined by one or more task records), one or more user comments, one or more teams the user belongs to, one or more of the user display settings (e.g., colors, size, project order, task order, etc.), one or more authorized applications, one or more presence/interaction parameters (e.g., indicating presence and/or interaction level at an environment level, project level, task all, application level, etc.), one or more notification settings, one or more progress parameters, status information for one or more tasks the user is associated with, one or more statistics related to a given user (e.g., how many tasks the user has completed, how quickly the user completed the tasks, the efficiency of the user, bandwidth of the user, activity level of the user, etc.), application access information (e.g., username/password for one or more third-party applications), one or more favorites and/or priorities, other user parameters for the given user, and/or other user parameters, project parameters, and/or task parameters for one or more projects and/or tasks the given user is associated with.

The project parameters for projects managed within the collaboration environment may include parameters describing one or more projects managed within the collaboration environment and/or via the collaboration work management platform, and/or the metadata associated with the one or more projects. Individual ones of the projects may be associated with individual ones of the project records. A project record may define values of the project parameters associated with a given project managed within the collaboration environment and/or via the collaboration work management platform. A given project may have one or more owners and/or one or more team members working on the given project. The given project may include one or more tasks assigned to one or more users under the given project heading.

The project parameters may, by way of non-limiting example, include one or more of: one or more tasks within individual ones of the projects (which may include task parameters defined by one or more task records), one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project members (e.g., an owner, one or more other project members, member access information, and/or other project members and/or member information), a status and/or progress (e.g., an update, a hardcoded status update, a measured status, quantity of tasks remaining in a given project, completed tasks in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of tasks within the given project, state of a workspace for a given task within the given project, other project parameters for the given project, and/or other project parameters, user parameters, and/or task parameters for one or more users and/or tasks the given project is associated with.

The task parameters for tasks within the collaboration environment may include parameters describing one or more tasks created and/or assigned within the collaboration environment and/or via the collaboration work management platform, and/or the metadata associated with the one or more tasks. Individual ones of the tasks may be associated with individual ones of the tasks records. A task record may define values of the task parameters associated with a given task created and/or assigned within the collaboration environment and or via the collaboration work management platform. The tasks make include one or more to-do items, action items, objectives, and/or other tasks one or more users should and/or plan on accomplishing. Tasks may be created by a given user for the given user and/or created by the given user and assigned to one or more other users.

The task parameters may, by way of non-limiting example, include one or more of: a task name, a task a description, a task status (e.g., complete, incomplete, and/or another status), an assignee, one or more followers, one or more team members, one or more task dates (e.g., a start date, a completion date, a due date, and/or other dates), one or more user comment parameters (e.g., a creator, a recipient, one or more followers, one or more other interested parties, content, one or more times, upvotes, other hard-coded responses, etc.), task upvotes, other hard-coded task responses, one or more tags, one or more custom fields (e.g., priority, cost, stages, and/or other custom fields), one or more dependencies (e.g., tasks dependent on, dependent tasks. Users assigned to dependent tasks, notification settings for dependent tasks, and/or other dependencies), a task URL, one or more subtasks and/or subtask parameters (e.g., name, description, hardcoded status, assignees, due date, state date, comments, upvotes, tags, and/or other subtask parameters), one or more attachments, one or more interaction parameters (e.g., sources of the interactions, context of the interactions, content of the interactions, time for the interactions, and/or other interaction parameters), state of a workspace for a given task (e.g., application state parameters, application status, application interactions, user information, and/or other parameters related to the state of the workspace for a given task), other task parameters for the given task, and/or other task parameters, user parameters, and/or project parameters for one or more users and/or project(s) the given task is associated with.

It is noted that any metadata and/or values of parameters related to any users, projects, and/or tasks may be considered values of user parameters, project parameters, and/or task parameters. The terms "user parameters", "project parameters", and/or "task parameters" may be used interchangeably herein.

As is illustrated in FIG. 1, system 100 may include one or more of: one or more servers 102, one or more chat server(s) 140, one or more client computing platforms 124, external resources 122, and/or other components. Users may interact with system 100 via one or more client computing platforms 124. The one or more servers 102 and/or chat server(s) 140 may be configured to communicate with one or more client computing platforms 124 according to a client/server architecture and/or other communication schemes. The one or more client computing platforms 124 may include one or more of a cellular telephone, a smartphone, a digital camera, a laptop, a tablet computer, a desktop computer, a television set-top box, smart TV, a gaming console, and/or other client computing platforms.

The one or more servers 102, chat server(s) 140, and/or client computing platform(s) 124 may include one or more physical processors 104, physical processors(s) 144, and/or physical processors 105 (also referred to herein as "one or more processors" and/or "processor(s)"), non-transitory electronic storage 126, and/or other components. Non-transitory electronic storage 126 may include one or more records. The one or more records may store the environment state information that defines the state of the collaboration environment. The state of the collaboration environment may include a user state, a project state, a task state, and/or other states. The records may include user records 128, project records 130, task records 132, and/or other records. The one or more physical processors 104 may be configured to access one or more of user records 128, project records 130, task records 132, and/or other records to effectuate transmission of the environment state information over network 132 to client computing platform(s) 124. Client computing platform(s) 124 may use the environment state information to effectuate presentation of the collaboration environment via client computing platform(s) 124. The one or more physical processors 104, physical processor(s) 144, and/or physical processors 105 may be configured to execute machine-readable instructions 106, machine-readable instructions 146, and/or machine-readable instructions 107. The machine-readable instructions 106, machine-readable instructions 146, and/or machine-readable instructions 107 may include one or more computer program components. The computer program components may include one or more of an environment state component 108, a chat application component 148, a collaboration environment component 110, a user chat component 112, a user task component 114, a trigger phrase component 116, and/or other components.

In some implementations, server(s) 102 and/or chat server(s) 140 may be configured to provide remote hosting of the features and/or functions of machine-readable instructions 106 and/or machine-readable instructions 107 to one or more client computing platform(s) 124 that may be remotely located from server(s) 102 and/or chat server(s) 140. In some implementations, one or more features and/or functions of server(s) 102 and/or chat server(s) 140 may be attributed as local features and/or functions of one or more client computing platform(s) 124. For example, individual ones of the client computing platform(s) 124 may include one or more additional machine-readable instructions 107 comprising the same or similar components as machine-readable instructions 106 of server(s) 102 and/or machine-readable instructions 146 of chat server(s) 140. The client computing platform(s) 124 may be configured to locally execute the one or more components that may be the same or similar to the machine-readable instructions 106. One or more features and/or functions of machine-readable instructions 106 of server(s) 102 may be provided, at least in part, as an application program that may be executed at a given client computing platform 124. One or more features and/or functions of machine-readable instructions 107 may be provided, at least in part, at a server(s) 102.

The electronic storage 126, electronic storage 142, and/or electronic storage 120 may include electronic storage media that electronically stores information. The electronic storage media of electronic storage 126, electronic storage 142, and/or electronic storage 120 may include one or both of system storage that is provided integrally (i.e., substantially non-removable) with one or more servers 102 and/or removable storage that is removably connected to one or more servers 102. The connection may be facilitated by, for example, a port (e.g., a USB port, a firewire port, etc.) or a drive (e.g., a disk drive, etc.).

The electronic storage 126, electronic storage 142, and/or electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 126, electronic storage 142, and/or electronic storage 120 may include one or more virtual storage resources (e.g., cloud storage, a virtual private network, and/or other virtual storage resources). The electronic storage 126, electronic storage 142, and/or electronic storage 120 may store software algorithms, information determined by processor(s) 104, information received by one or more servers 102, information received by client computing platforms 124, and/or other information that enables one or more servers 102 to function as described herein.

The electronic storage 126 may be configured to store one or more records and/or information. The one or more records may include one or more of user records 128, project records 130, task records 132, and/or other records. The one or more records (e.g., user records 128, project records 130, task records 132, and/or other records) may specify and or define values for one or more user parameters, project parameters, and/or other parameters for the collaboration environment. The one or more records may specify correspondences between one or more of the user records 128, project records 130, task records 132, and/or other records. The correspondences may be used to determine which user parameters and/or values, project parameters and/or values, and/or task parameters and/or values are associated with a given user, project, and/or task within the collaboration environment.

The client computing platform(s) 124 may monitor, and/or collect information for transmission to the one or more server(s) 102 to be stored as environment state information. The client computing platform(s) 124 may obtain and/or collect environment state information from the one or more server(s) 102.

The environment state component 108 of machine-readable instructions 106 may be configured to effectuate transmission of the environment state information to client computing platform(s) 124, and/or vice versa. In some implementations, environment state component 108 may be configured to receive information over network 132 from client computing platforms(s) 124. Environment state component 108 may be configured to effectuate storage of the received information as environment state information to one or more user records 128, project records 130, task records 132, and/or other records. Environment state component 108 may be configured to obtain one or more user records 128, project records 130, task records 132, and/or other records in response to and/or based on one or more requests from client computing platform(s) 124. Environment state component 108 may be configured to effectuate transmission of values for user parameters, values for project parameters, values for task parameters, and/or other state information to client computing platform(s) 124. The values for user parameters, values for project parameters, values for task parameters, and/or other state information may be used to effectuate presentation of the relevant tasks and/or projects for a given user of the collaboration environment associated with the given client computing platform 124 to which the values and/or other state information is transmitted.

Collaboration environment component 110 of machine-readable instructions 107 may be configured to effectuate presentation of a collaboration environment. Presentation of the collaboration environment may be based on environment state information. The environment state information may include user records, project records, task records, and/or other records. The environment state information may define a state of the collaboration environment. The state of the collaboration environment may include a user state, a project state, a task state, and/or other states. The user state may be defined by the user records. The user records may define values of user parameters associated with users interacting with and/or viewing the collaboration environment. The project state may be defined by the project records. The project records may define values of project parameters for projects managed within the collaboration environment. The task state may be defined by the task records. The task records may define values of task parameters for tasks created and/or assigned within the collaboration environment.

The client computing platform(s) 124 may effectuate presentation of the collaboration environment. The collaboration environment may include the environment in which users interact with and/or view the one or more tasks and/or projects managed via the collaboration work management platform. The collaboration environment may exist whether or not a given user is viewing and/or interacting with the collaboration environment. In some implementations, projects managed vie the collaboration environment may include one or more tasks. By way of non-limiting example, the one or more tasks may include action items, to-do items, and/or objectives within a given project. The one or more tasks may be assigned to one or more users such that the one or more tasks assigned to a given user may appear on a given user's task list within the collaboration environment.

User chat component 112 may be configured to obtain content information characterizing content of the chat sessions between the users of the collaboration environment. Content information for the chat sessions may be obtained at the conclusion of a chat session, and/or in real-time and/or near real-time during the chat session. Chat sessions may include a series of communications between two or more users of the collaboration environment. The chat sessions may include one or more of a messenger chat session, a video chat session, a phone chat session, and/or other chat sessions. The chat sessions may include a first chat session between a first user and a second user, such that first content information characterizing content of the first chat session is obtained. In some implementations, the chat sessions may be related to and/or specific to a given project and/or task within the collaboration environment. As such, the users participating in the given chat session may be working on and/or discussing the related and/or specific project and/or task. The first chat session may be a task-specific chat session. For example, the first chat session may relate to Task A. In some implementations, the chat sessions may be between two users and/or more than two users. User chat component 112 may be configured to transcribe one or more spoken communications. In some implementations, user chat component 112 may be configured to determine a source and/or intended recipient of individual chat items within the chat session.

The content information obtained by user chat component 112 may describe the content included in a given chat session. By way of non-limiting example, that content information may include one or more communication inputs by the users within the chat sessions, one or more spoken and/or transcribed communications spoken by the users within the chat sessions, one or more words and/or phrases included in the chat sessions, a source of the spoken and/or textual communications, an intended recipient of the spoken and/or textual communications, and/or other content information. The communication inputs in the chat session may be presented through a graphical chat interface on the client computing platform(s) 124. The user may select a full and/or partial view of the graphical chat interface within the graphical user interfaces associated with the collaboration environment presented on the client computing platforms 124.

In some implementations, the content information may include context information. Context information may include setting information, content information for communications immediately preceding and/or following a trigger word and/or phrase, information describing the one or more tasks and/or projects the chat session relates to, user information for one or more of the users participating in the chat session (e.g., one or more projects and/or tasks associated with the user, the user's role/department/qualifications, historical user information, and/or other user information), and/or other context information. The first content information may include first context information and wherein the first task is generated based on the first context information for the first chat session.

In some implementations, the chat sessions may facilitate synchronous and/or semi-synchronous communication between the users of the collaboration environment. By way of non-limiting example, the synchronous and/or semi-synchronous communication may include phone communications, video communications, messenger communications, and/or other communication. In some implementations, the chat sessions may be text chat sessions. In some implementations, the chat sessions may be voice and/or video chat sessions.

The content from the chat sessions that may trigger generation of the tasks for the users may include one or more trigger phrases and/or words. The trigger phrases and/or words may include one or more phrases or words that trigger generation of a user task. In some implementations, user chat component 112 may be configured to determine and/or identify one or more trigger phrases and/or words.

In some implementations, user chat component 112 may be configured to implement an instance of a chat session to facilitate synchronous communication between the users within the collaboration environment. User chat component 112 may receive an/or transmit the communications (e.g., textual communications, voice communications, video communications, etc.) that make up the chat session to the client may computing platforms for presentation through graphical chat interfaces. The graphical chat interface may be part of and/or external to the collaboration environment. The chat sessions may be hosted by the collaboration platform and/or one or more third party chat applications (e.g., Slack, Skype, Outlook Messenger, etc.) integrated with the collaboration platform via an application program interface (API). The chat-sessions may be provided by one or more third-party chat applications via one or more APIs. In some implementations the collaboration platform may host and/or provide one or more of the chat sessions.

The chat interface may include its own interface and/or a portion of one or more collaboration environment interfaces for displaying one or more tasks and/or projects for a given user. User chat component 112 may be configured to effectuate presentation of the graphical chat interfaces via the client computing platforms within and/or outside the collaboration environment. The first chat session may be presented to the first user via a first chat interface presented on a first client computing platform associated with the first user, and/or to the second user via a second chat interface presented on a second client computing platform associated with the second user.

User task component 114 may be configured to generate tasks for the users based on the content from the chat sessions. In some implementations, the tasks may be generated in real-time and/or near real-time during the chat session. By way of non-limiting example, as the user starts typing within the chat interface, user task component 114 may identify one or more tasks that should be generated. The tasks, in some implementations, may be generated at or near the conclusion of the chat sessions. In some implementations, one or more tasks generated based on the content from the chat sessions may be presented to one or more of the users as one or more potential tasks. The potential tasks may be presented to the one or more users for confirmation and/or acceptance. One or more of the users may accept and/or confirm one or more of the potential tasks at the conclusion of the given chat session to generate the tasks. A chat session may conclude when: a threshold amount of time passes without any communication from one or more users, a user exits or closes the chat interface, the user minimizes the chat interface, the user responds to a request with acceptance language (e.g., "sure", "okay", "will do", "I'll take care of it.", etc.) and/or the user otherwise concludes the chat session.

In some implementations, the one or more tasks may be generated based on information from multiple users within a chat session being pieced together to make generate the one or more tasks. Generating the one or more tasks may include determining and/or recommending which user(s) should be assigned the tasks, whether the task should be dependent on one or more other tasks, and/or other characteristics of the tasks based on the content from the chat session.

In some implementations, the tasks may be automatically generated and/or accepted by the users based on the content information. By way of non-limiting example, the user task component 114 may be configured to identify acceptance language based on the content information for the chat sessions. Responsive to the user task component 114 identifying acceptance language in response to communications triggering generation of a task, user task component 114 may automatically accept the generated task on behalf of the user.

In some implementations, user task component 114 may identify one or more task should and/or could be generate and/or provide the user with one or more prompting questions for generating the one or more tasks. By way of non-limiting example, if user A starts typing to users B, C, and D "We need to follow-up with X supplier . . . ", user task component 114 may prompt user A with one or more questions for generating the task (e.g., "Who should follow up with X supplier?", "When do you want this user to follow up with X supplier by?", etc.). User task component 114 may generate the task for following-up with X supplier based on the responses to these questions.

A first task may be generated based on the first content information for the first chat session. In some implementations, the first task may be generated responsive to identifying a first trigger phrase and/or word in the first chat session based on the first content information. Generating the tasks for the users based on the content from the chat sessions may include automatically generating one or more fields describing the tasks based on the content information. Generating the tasks based on the content information may include automatically initiating the one or more tasks, and/or automatically generating one or more fields describing the tasks. As such, by way of non-limiting example, generating a first task may include initiating the first task and/or generating one or more first fields describing the first task based on the first content information. In some implementations, by way of non-limiting example, the one or more fields may include one or more of a task title, a task description, a task due-date, a task assignee, a task start date, a project and/or task associated with the generated task, a task dependency, and/or other fields associated with the task.

The tasks may be further generated based on context of the chat sessions. As such, the first task may be generated based on first context information related to the first chat session, the first user and/or the second user, a first project and/or task, and/or other context information. The tasks may include a task (e.g., to-do items, action items, objectives, and/or other tasks one or more users should and/or plan on accomplishing) within an overarching project, a subtask (e.g., to-do items, action items, objectives, and/or other tasks one or more users should and/or plan on accomplishing) under an overarching task, and/or other tasks.

User task component 114 may be configured to store information defining the tasks generated as part of the state information. As such, the first task may be defined by a first task record. User task component 114 may be configured to communicate with collaboration environment component 110 and/or environment state component 108 to effectuate storage of the information defining the tasks generated as part of the state information.

In some implementations, user task component 114 may be configured to modify one or more tasks based on the content from the chat sessions. Modifying one or more tasks may include modifying, changing, adjusting, adding, and/or removing one or more characteristics associated with individual ones of the tasks. By way of non-limiting example, the one or more characteristics of individual ones of the tasks may include one or more of a task description, a user assigned to a task, a due date, a start date, and/or other characteristics of the individual ones of the tasks. A second task may be modified based on the first content information for the first chat session. User task component 114 may be configured to store information defining modifications of the tasks as part of the state information. As such, a first task modification for the second task may defined by a second task record.

Figure 2:
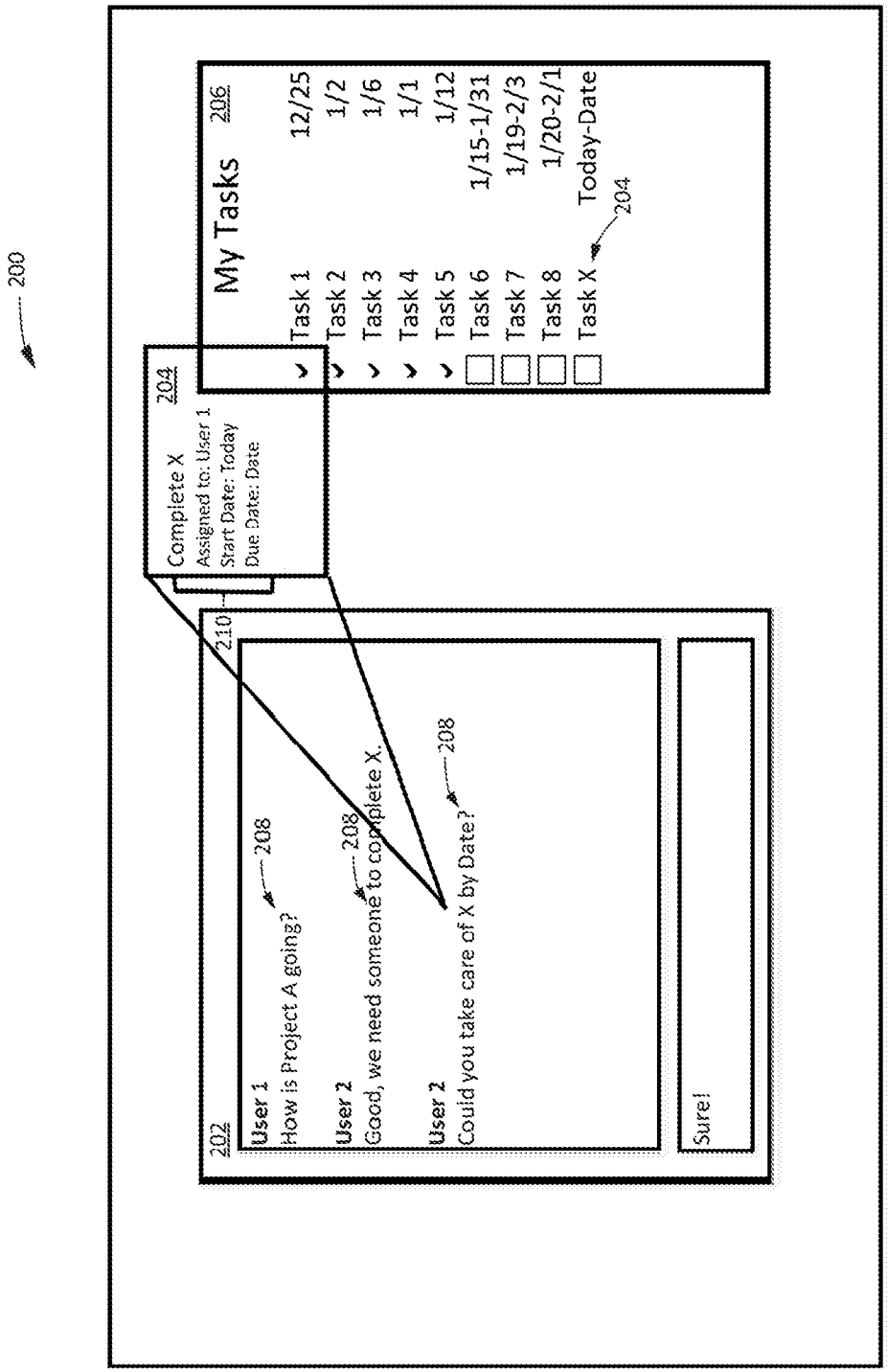
FIG. 2 illustrates an exemplary chat interface from which content information is obtained and used as a basis for generating user tasks, in accordance with one or more implementations.

FIG. 2 illustrates an exemplary chat interface from which content information is obtained and used as a basis for generating user tasks, in accordance with one or more implementations. In some implementations, chat interface 202 may be presented within a view of collaboration environment 200. Textual communications 208 may be exchanged between User 1 and User 2 via chat interface 202. Content information describing and/or including one or more textual communications 208 may be used to generate task 204. One or more fields 210 may be automatically generated for task 205 based on the content information characterizing the content of the chat session (e.g., textual communications 208). Task interface 206 may be presented as part of collaboration environment 200. Task interface 206 may list one or more tasks assigned to user 2. Task 204 and/or information from one or more of fields 210 may be automatically added to and/or displayed via task interface 206.

Returning to FIG. 1, trigger phrase component 116 may be configured to identify potential content in the content of the chat sessions that leads to initiation of one or more of the tasks by the users based on the environment state information. The potential content may include content that is likely to trigger generation of a user task by a user. The content from the chat sessions that may trigger generation of the tasks for the users may include one or more trigger phrases and/or words. The trigger phrases and/or words may include one or more phrases or words that trigger generation of a user task. In some implementations, trigger phrase component 116 may be configured to identify potential trigger phrases and/or words based on the potential content identified. In some implementations, user chat component 112 may be configured to determine and/or identify one or more trigger phrases and/or words. Trigger phrase component 116 may be configured to identify potential content in the content of the chat sessions that leads to initiation of one or more of the tasks by the users. The potential content that leads to initiation of one or more of the tasks in the collaboration environment by the users may be identified based on the environment state information.

User chat component 112 may be configured to identify potential trigger phrases and/or words based on the potential content identified. The trigger phrases and/or words may indicate an assignment and/or one user's request, desire, inquiry, and/or need to another user. By way of non-limiting example, user chat component 112 may monitor chat sessions between users in the collaboration environment and/or identify that whenever a user states "Will you complete X . . . " they typically generate a task for X shortly thereafter. As such, user chat component may identify "will you" as a trigger phrase. By way of non-limiting example, the trigger phrases and/or words may include one or more of will you, can you, could you, please, by a given date, before the given date, we need, I need, I want, would be grateful if, and/or you could.

In some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 112, 114, 116, 118, 120, 122, and/or other components. Processor(s) 128 may be configured to execute components 108, 110, 112, 114, 116, 118, 120, 122, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and 122 are illustrated in FIG. 1 as being implemented within a single processing unit, in implementations in which processor(s) 128 includes multiple processing units, one or more of components 108, 110, 112, 114, 116, and/or 148 may be implemented remotely from the other components. The description of the functionality provided by the different components 108, 110, 112, 114, 116, and/or 148 described below is for illustrative purposes, and is not intended to be limiting, as any of components 108, 110, 112, 114, 116, and/or 148 may provide more or less functionality than is described. For example, one or more of components 108, 110, 112, 114, 116, and/or 148 may be eliminated, and some or all of its functionality may be provided by other ones of components 108, 110, 112, 114, 116, and/or 148. As another example, processor(s) 128 may be configured to execute one or more additional components that may perform some or all of the functionality attributed below to one of components 108, 110, 112, 114, 116, and/or 148.

FIG. 2 illustrates a method 200 for generating tasks based on chat sessions between users of a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining content information characterizing content of the chat sessions between the users of the collaboration environment. The chat sessions may facilitate synchronous communication between the users and wherein the chat sessions include a first chat session between a first user and a second user, such that first content information characterizing content of the first chat session is obtained. Operation 202 may be performed by one or more hardware processors configured by machine-readable instructions including a component that is the same as or similar to user chat component 112, in accordance with one or more implementations.

An operation 204 may include generating tasks for the users based on the content from the chat sessions, a first task being generated based on the first content information for the first chat session. Operation 204 may be performed by one or more hardware processors configured by machine-readable instructions including a component that is the same as or similar to user task component 114, in accordance with one or more implementations.

An operation 206 may include storing information defining the tasks generated as part of the state information such that the first task is defined by a first task record. Operation 206 may be performed by one or more hardware processors configured by machine-readable instructions including a component that is the same as or similar to information storing component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to modify tasks based on chat sessions, the system comprising:
    non-transitory electronic storage; and
    one or more hardware processors configured by machine-readable instructions to:
        obtain content information characterizing content of chat sessions between users of a collaboration environment, wherein the chat sessions facilitate synchronous communication between the users and wherein the chat sessions include a first chat session between a first user and a second user, such that first content information characterizes the content of the first chat session;
        modify one or more tasks based on the content from the chat sessions, wherein a first task is modified by a first task modification based on the first content information for the first chat session; and
        store information defining modifications of individual tasks as part of individual tasks records defining the individual tasks, such that the first task modification for the first task is defined within a first task record of the first task.

2. The system of claim 1, wherein the one or more hardware processors are further configured by the machine-readable instructions to:
    implement an instance of a chat session to facilitate the synchronous communication between the users within the collaboration environment, and
    transmit communications that make up the chat session to client computing platforms for presentation through graphical chat interfaces, the graphical chat interfaces being presented on the client computing platforms within and/or outside the collaboration environment, such that the first chat session is presented to the first user via a first chat interface presented on a first client computing platform associated with the first user.

3. The system of claim 1, wherein the one or more hardware processors are further configured by the machine-readable instructions to:
    identify potential content in the content of the chat sessions that leads to the modification of the one or more tasks; and
    identify potential trigger phrases based on the potential content.

4. The system of claim 3, wherein the content from the chat sessions that leads to the modification of the one or more tasks includes trigger phrases and/or words, such that the one or more tasks are modified responsive to identifying one or more of the trigger phrases and/or words, wherein the first task is modified by the first task modification responsive to identifying a first trigger phrase and/or word in the first chat session.

5. The system of claim 4, wherein the trigger phrases and/or words include one or more of will you, can you, could you, please, by a given date, before the given date, we need, I need, I want, would be grateful if, or you could.

6. The system of claim 1, wherein the one or more tasks are modified based on context of the chat sessions, wherein the first content information includes first context information and wherein the first task is modified based on the first context information for the first chat session.

7. The system of claim 1, wherein the chat sessions are textual chat sessions.

8. The system of claim 1, wherein the chat sessions are voice and/or video chat sessions.

9. The system of claim 1, wherein modifying the one or more tasks based on the content from the chat sessions includes automatically modifying one or more fields describing the individual tasks based on the content information.

10. The system of claim 1, wherein the first chat session is a task-specific chat session.

11. A method to modify tasks based on chat sessions, the method comprising:
    obtaining content information characterizing content of chat sessions between users of a collaboration environment, wherein the chat sessions facilitate synchronous communication between the users and wherein the chat sessions include a first chat session between a first user and a second user, including obtaining first content information characterizing the content of the first chat session;
    modifying one or more tasks based on the content from the chat sessions, including modifying a first task by a first task modification based on the first content information for the first chat session; and
    storing information defining modifications of individual tasks as part of individual tasks records defining the individual tasks, such that the first task modification for the first task is defined within a first task record of the first task.

12. The method of claim 11, further comprising:
    implementing an instance of a chat session to facilitate the synchronous communication between the users within the collaboration environment, and
    transmitting communications that make up the chat session to client computing platforms for presentation through graphical chat interfaces, the graphical chat interfaces being presented on the client computing platforms within and/or outside the collaboration environment, such that the first chat session is presented to the first user via a first chat interface presented on a first client computing platform associated with the first user.

13. The method of claim 11, further comprising:
    identifying potential content in the content of the chat sessions that leads to the modification of the one or more tasks; and
    identifying potential trigger phrases based on the potential content.

14. The method of claim 13, wherein the content from the chat sessions that leads to the modification of the one or more tasks includes trigger phrases and/or words, such that the one or more tasks are modified responsive to identifying one or more of the trigger phrases and/or words, wherein the first task is modified by the first task modification responsive to identifying a first trigger phrase and/or word in the first chat session.

15. The method of claim 14, wherein the trigger phrases and/or words include one or more of will you, can you, could you, please, by a given date, before the given date, we need, I need, I want, would be grateful if, or you could.

16. The method of claim 11, wherein the one or more tasks are modified based on context of the chat sessions, wherein the first content information includes first context information and wherein the first task is modified based on the first context information for the first chat session.

17. The method of claim 11, wherein the chat sessions are textual chat sessions.

18. The method of claim 11, wherein the chat sessions are voice and/or video chat sessions.

19. The method of claim 11, wherein modifying the one or more tasks based on the content from the chat sessions includes automatically modifying one or more fields describing the individual tasks based on the content information.

20. The method of claim 11, wherein the first chat session is a task-specific chat session.

* * * * *